US006944990B2

(12) United States Patent
Noyes

(10) Patent No.: US 6,944,990 B2
(45) Date of Patent: Sep. 20, 2005

(54) WINDOW MOUNTED AUTOMATIC PET DOOR

(76) Inventor: Crosby S. Noyes, P.O. Box 72, Sorrento, ME (US) 04677

( * ) Notice: Subject to any disclaimer, the term of this patent is extended or adjusted under 35 U.S.C. 154(b) by 276 days.

(21) Appl. No.: 10/320,522

(22) Filed: Dec. 17, 2002

(65) Prior Publication Data

US 2004/0113796 A1 Jun. 17, 2004

(51) Int. Cl.[7] ............................................... E05F 11/52
(52) U.S. Cl. ........................................ 49/169; 119/484
(58) Field of Search ...................... 49/169, 170, 360; 119/416, 484, 485, 622; D30/108

(56) References Cited

U.S. PATENT DOCUMENTS

| 45,774 | A | * | 1/1865 | Warnick et al. | 102/275.1 |
|---|---|---|---|---|---|
| 1,460,945 | A | * | 7/1923 | Chaplin | 119/484 |
| 3,403,474 | A | * | 10/1968 | Spasoff | 49/360 |
| 4,029,048 | A | * | 6/1977 | Gershbein | 119/165 |
| 4,224,899 | A | * | 9/1980 | Cruchelow et al. | 119/501 |
| 4,291,645 | A | * | 9/1981 | Cruchelow et al. | 119/484 |
| 4,445,459 | A | * | 5/1984 | Julie | 119/28.5 |
| 4,674,231 | A | * | 6/1987 | Radek et al. | 49/118 |
| 4,989,546 | A | * | 2/1991 | Cannaday | 119/484 |
| 4,995,336 | A | * | 2/1991 | Deemer et al. | 119/484 |
| 5,148,767 | A | * | 9/1992 | Torchio | 119/484 |
| 5,165,366 | A | * | 11/1992 | Harvey | 119/165 |
| 5,261,350 | A | * | 11/1993 | Vavrek | 119/484 |
| 5,469,807 | A | * | 11/1995 | Kosmaczeska | 119/484 |
| 5,522,344 | A | * | 6/1996 | Demurjian | 119/474 |
| 5,842,438 | A | * | 12/1998 | Messmer | 119/165 |
| 5,992,096 | A | * | 11/1999 | De La Cerda et al. | 49/169 |
| 6,141,911 | A | * | 11/2000 | Reid | 49/394 |
| 6,253,711 | B1 | * | 7/2001 | Shibles | 119/484 |
| 6,401,663 | B1 | * | 6/2002 | Meier, Jr. | 119/452 |
| 6,453,847 | B2 | * | 9/2002 | Brooks | 119/484 |
| 6,658,793 | B2 | * | 12/2003 | Perron | 49/123 |
| 6,691,463 | B1 | * | 2/2004 | Richmond | 49/360 |

* cited by examiner

Primary Examiner—Gregory J. Strimbu
(74) Attorney, Agent, or Firm—Anthony D. Pellegrini, Esq.

(57) ABSTRACT

A window mounted automatic pet door device having a pet-specific identification component whereby only authorized animals are permitted to access the pet door. The device includes an automatically operated interally sliding door to accommodate pet ingress and egress. The device is intended to solve problems inherent in the prior art by providing for installation and use of the device in a window, including upper floor windows, without significantly modifying the window unit, thereby increasing the availability of suitable installation locations and appealing to pet owners who do not wish to structurally modify their homes. It also provides a pet access platform component to give a pet a convenient structure for approaching the device.

32 Claims, 9 Drawing Sheets

WINDOW MOUNTED AUTOMATIC PET DOOR

BACKGROUND OF THE INVENTION

1. Technical Field

The invention relates generally to the field of pet doors and is directed to a device adapted to be mounted in a window and comprising a pet-specific identification component and a powered door. More specifically, the invention is directed to an improved automatic pet door device designed to be easily installed and deinstalled in a variety of locations with only minimal structural modification required, with features allowing only designated pets to use the device.

2. Description of Prior Art

Pet door devices have been well-know in the field. Early pet door devices were mounted in doors or cut into walls, and consisted of a door panel hinged at the top edge and operated by the pet applying a force against the door panel to allow for through passage. While these early devices permitted pets egress and ingress without the need for owner attention, any animal (or even children or intruders) could pass through the pet door. Subsequent designs sought to incorporate various locking mechanisms with corresponding keys, to allow only certain pets access. Other devices employed power, to allow the pet door to be opened and closed with resort to the pet applying a force against the door panel. In all of these designs, however, the pet door device is a permanent fixture; once installed, it cannot be removed without extensive repair work needed.

The prior art discloses various pet door devices. One example of a prior art pet door is disclosed in U.S. Pat. No. 5,967,215 (Needham), issued on Oct. 19, 1999. This patent discloses a one- and two-way pet screen door kit for installation in an existing screen door or window screen. This device uses magnetic latches to control access. It also makes use of a ramp for above-ground installations. This device necessarily involves structural modifications to the screen door or window screen for installation purposes. It also does not make use of a pet-specific identification device; any animal carrying a magnetic key will be provided access. The door is also not powered, relying on contact by the animal to push it open.

A device which improves on the concept disclosed in '215 (Needham) is U.S. Pat. No. 6,141,911 (Reid), issued on Nov. 7, 2000. '911 (Reid) discloses a pet door providing access via a door with a locking/unlocking mechanism activated by a pet-specific key device consisting of a tuned receiver and a signal transmitting key. This allows individual pets to be identified for access, whereby a simple magnetic key permits access to any pet carrying a magnetic key. However, the other deficiencies noted in '215 (Needham) remain with '911 (Reid). Moreover, by utilizing a signal transmitting key, the key device in '911 (Reid) may be overly large and uncomfortable for a pet to wear, and may also present safety concerns.

U.S. Pat. No. 5,872,516 (Bonge), issued Feb. 16, 1999, discloses a remotely operated pet door which automatically opens under its own power when it receives a signal from an ultrasonic transmitter worn by a pet. This device represents yet another improvement over the concepts disclosed above, in that the door is powered. It does not address the other deficiencies. U.S. Pat. No. 5,177,900 (Solowiej), issued Jan. 12, 1993, discloses an automatic pet door having a vertically moving door activated by a radiation transmitter worn by the pet. This device is similar in concept to '516 (Bonge), except it uses radio signals instead of ultrasonic signals.

U.S. Pat. No. 6,297,739 (Small), issued on Oct. 2, 2001, discloses a powered automatic pet door using a combination of a pet-specific identification device, a weight sensor, and a motion sensor to control access. The identification device may be implanted subcutaneously in the body of the pet. It also utilizes an interface to a home security system. This device resolves many of the deficiencies present in the prior art. However, it still necessarily involves structural modifications to a door or wall for installation purposes.

None of the foregoing devices utilize a mounting system adapted for easy installation and deinstallation in ordinary double-hung windows. Nor do the foregoing devices disclose a platform system enabling pets to access the device when it is mounted in out of the way locations or is otherwise inconvenient to the floor or ground. It is an objective of this invention to provide a new and improved automatic pet door device adapted for window mounting. Other objectives of this invention will be readily apparent from the description that follows.

SUMMARY

In one aspect, the invention is directed to a window mounted automatic pet door device having a pet-specific identification component whereby only authorized animals are permitted to access the pet door. The device is intended to solve problems inherent in the prior art by employing a means for installing and using the device in a window, including upper floor windows, without significantly modifying the window unit, thereby increasing the availability of suitable installation locations and appealing to pet owners who do not wish to structurally modify their homes. The device comprises a casing, having a housing component, a pet access platform component, a window mount component, a door positioning component, and an identification component, wherein the casing contains a pet access aperture through which a pet may pass and a laterally sliding door suitably adapted for covering and uncovering the pet access aperture, the pet access platform component is situated adjacent to the pet access aperture providing the pet with a platform next to the door on which to stand when the device is located above ground or floor level, the window mount component secures the device to a double hung window and permits operation of both the device and the window, the door positioning component is electrically powered and activated by the pet and moves the door laterally to cover and uncover the pet access aperture, and the identification component discerns between individual animals and permits access through the door only to designated pets under predetermined conditions.

The device is intended to be used with small pets, such as cats and small dogs, and may be easily installed and deinstalled in different windows as needed, for example both in a primary residence and seasonally in a vacation home. One aspect of the device employs ramps so that access to the device may be had by pets that cannot jump to the level of a window, such as dogs or older or very young cats, or for use in upper floor windows. The device makes use of a pet-specific identification component, so that different pets in the neighborhood, or even within the same household, can be selectively permitted or denied access to the device.

Other features and advantages of the invention are described below.

DESCRIPTION OF THE INVENTION

Figure 1:
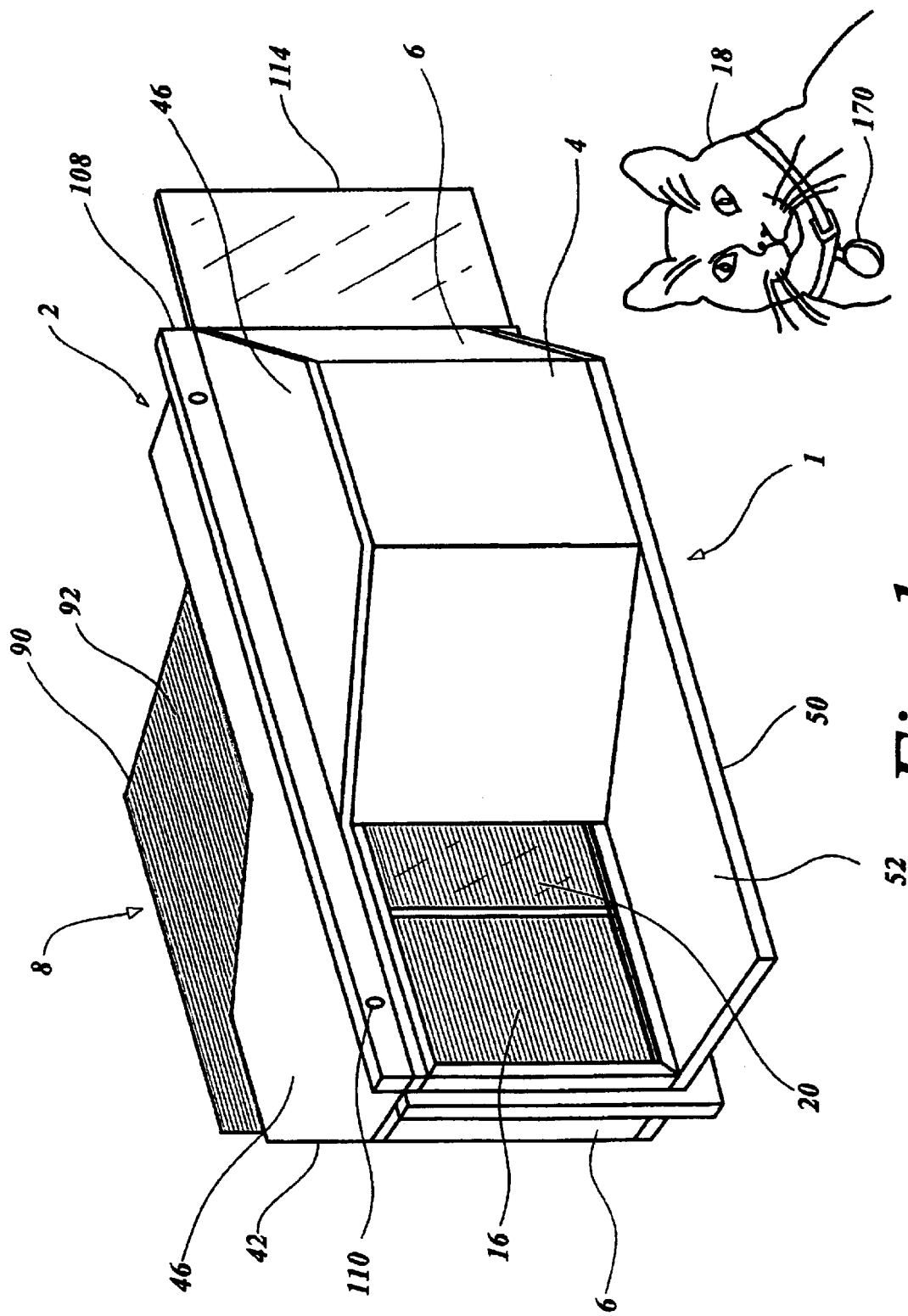
FIG. 1 is a perspective view of the device showing the door in a partially opened position along with a pet carrying a key device.

FIG. 1 shows a perspective view of one embodiment of an automatic pet door device 1 adapted for window mounting. The device 1 comprises a pet identification component 14 permitting only designated animals 18 to use the device 1. The window mount component 10 of the device 1 permits it to be installed in a window 22 without having to structurally alter the window 22, walls, or doors, as is necessary with other pet door devices. The pet access platform component 8 gives the pet 18 a convenient means for approaching the device 1 when the device 1 is installed above ground or floor level. The device 1 is intended to permit pets 18 to enter or exit a structure, such as a house, garage, or other building, through an existing window 22 in a controlled manner, with a minimum of effort, while minimizing the impact of this activity on the structure and without the need for direct participation by the pet owner.

The basic components of the device 1 include a casing 2, which in turn incorporates a housing component 4 and a pet access aperture 16, a door 20 adapted to cover and uncover the pet access aperture 16, a pet access platform component 8, a window mount component 10, a door positioning component 12 (shown in greater detail in FIG. 4), and an identification component 14. The casing 2 contains the other components 4,8,10,12,14, which are enclosed within the housing component 4 and/or integrated into and attached to the casing 2. The window mount component 10 is adapted to secure the device 1 within a double hung window 22, without necessitating structural modification to the window 22, and is further adapted to permit operation of the window 22 after mounting the device 1 therein. The window mount component 10 is also adapted to provide weather proofing when the device 1 is in use. The door positioning component 12 comprises electrical and mechanical means for moving the door 20 laterally across the pet access aperture 16, thereby covering and uncovering the pet access aperture 16, whereby a pet 18 may pass through the pet access aperture 16 when it is in an uncovered, or open, state, and the pet 18 is prevented from passing through the pet access aperture 16 when it is in the covered, or closed, state. The door positioning component 12 is adapted to position the door 20 without the need for the pet 18 to contact the door 20. The door positioning component 12 also provides security for the device 1, maintaining the door 20 in a closed position until the device 1 is properly accessed by a designated pet 18 or by the user. The door positioning component 12 is contained within the housing component 4, thereby protecting it from the elements and also minimizing the likelihood that the moving elements of the door positioning component 12 will come in contact with the pet 18, so as to avoid injury. The identification component 14 is adapted to activate the door positioning component 12 when an authorized pet 18 is identified so that the pet 18 may pass through the pet access aperture 16, initiating a sequence of steps for uncovering the pet access aperture 16 and then covering the pet access aperture 16 with the door 20. In one embodiment, the identification component 14 is comprised of at least two subcomponents, one of which, the key device 170, is carried by the pet 18, the other of which is integrated with the casing 2. In this embodiment, the identification component 14 is adapted to be activated when a pet 18 carrying the key device 170 comes within a predetermined near proximity to the door 20 of the device 1; when such occurs, the identification component 14 resolves whether the pet 18 is permitted access, and if so, activates the door positioning component 12 to position the door 20 in the open position, thereby permitting the pet 18 to pass through the pet access aperture 16. The identification component 14 may be configured to accept only certain individual pets 18 carrying a key device 170, or to permit passage of a pet 18 through the pet access aperture 16 in only one direction (e.g., only to let the pet 18 in or only to let the pet 18 out), or to limit the time periods during which a pet 18 may activate the door 20, or any combination of the foregoing.

The casing 2 is defined as having an interior portion 38 and an exterior portion 36, and as having a midline plane 40 oriented substantially vertically which separates the interior portion 38 from the exterior portion 36. The interior portion 38 of the casing 2 is that portion which, when the device 1 is installed in a window 22, is located primarily within the interior of the structure containing the window 22, e.g., "inside the house," while the exterior portion 36 of the casing 2 is that portion which is located primarily exterior to the structure containing the window 22, e.g., "outside the house." The midline plane 40 is oriented substantially coplanar with the glass pane of the window 22. In one embodiment of the device 1, the pet access aperture 16 is situated substantially coplanar with the midline plane 40. A pet 18 utilizing the device 1 to exit a structure approaches the pet access aperture 16 from the interior portion 38 of the casing 2, then passes through the pet access aperture 16, and continues past the exterior portion 36 of the casing 2.

In addition to the housing component 4, the casing 2 is comprised of a top panel 42 and a base panel 50. The top panel 42 is constructed of a rigid material, is substantially planar, is oriented substantially in a horizontal plane, and has an upper surface 46 and a lower surface 48. The base panel 50 is constructed of a rigid material, is substantially planar, is oriented substantially in a horizontal plane substantially parallel to the top panel 42, and has an upper surface 52 and a lower surface 54. The top panel 42 provides the point of contact between the device 1 and the sash 26 of a double hung window 22. The base panel 50 provides the point of contact between the device 1 and the base of the window unit 22. The housing component 4 is situated between the top panel 42 and the base panel 50, with the housing component 4 being fixedly attached to the lower surface 48 of the top panel 42 and fixedly attached to the upper surface 52 of the base panel 50. In one embodiment, the housing component 4 is comprised of lateral sides constructed of a rigid material and which, together with the top panel 42 and the base panel 50, define a substantially enclosed space. The lateral sides 6 of the housing component 4 may be constructed of plexiglass, polystyrene, or other such materials providing strength and rigidity along with being light weight. The housing component 4 may be transparent, translucent, tinted, or opaque. In one embodiment the lateral sides 6 of the housing component 4 are oriented substantially vertically. One or more of the lateral sides 6 of the housing component 4 may be removably attached to the rest of the housing component 4, thereby providing access to the interior of the housing component 4. The housing component 4 is situated within the casing 2 substantially within the interior portion 38 of the casing 2. In one embodiment, the top panel 42, base panel 50, and housing component 4 may be constructed of high impact plastic using injection molding methods.

The pet access aperture 16 is situated within the casing 2 adjacent to the housing component 4. The door 20 controlling access through the device 1 is planar, is constructed of a rigid material, is of a uniform thickness, is substantially rectangular in shape, and is suitably dimensioned to substantially cover the pet access aperture 16. Other shapes for the door 20 which accomplish the task of completely covering the pet access aperture 16 are also anticipated by this invention. In one embodiment the door 20 is constructed of a transparent, colorless material, thereby giving the pet 18 a clear view through the device 1. In another embodiment of the device 1, the pet access aperture 16 is substantially rectangular and defined by an upper track 56 and a lower track 66, each having a first end 60,70 and a second end 62,72, which comprise the top and bottom edges of the pet access aperture 16, a receiving track 76 having an upper end 78 and a lower end 80, and the housing component 4, with the receiving track 76 and the housing component 4 comprising the side edges of the pet access aperture 16. Each of the tracks 56,66,76 is constructed of a rigid material. The three tracks 56,66,76 each comprise a u-shaped channel 64,74,82 suitably dimensioned to accommodate the thickness of the door 20. The housing component 4 contains a vertical door aperture 84 adjacent to the pet access aperture 16 and suitably adapted to accommodate the thickness of the door 20. In this embodiment the upper track 56 is situated along the lower surface 48 of the top panel 42 with the second end 62 of the upper track 56 extending through the vertical door aperture 84 and into the housing component 4, and with the u-shaped channel 64 of the upper track 56 oriented substantially downward. The lower track 66 is situated along the upper surface 52 of the base panel 50 with the second end 72 of the lower track 66 extending through the vertical door aperture 84 and into the housing component 4, with the u-shaped channel 74 of the lower track 66 oriented substantially upward and with the lower track 66 oriented substantially parallel to and in alignment with the upper track 56. The receiving track 76 is situated in connection with the upper track 56 and the lower track 66 such that the upper end 78 of the receiving track 76 is in connection with the first end 60 of the upper track 56 and the lower end 80 of the receiving track 76 is in connection with the first end 70 of the lower track 66, with the receiving track 76 being oriented substantially perpendicular to both the upper track 56 and the lower track 66 and having a substantially vertical orientation, and with the u-shaped channel 82 of the receiving track 76 oriented substantially towards the vertical door aperture 84. The upper edge 28 of the door 20 is situated within the u-shaped channel 64 of the upper track 56 and the lower edge 30 of the door 20 is situated within the u-shaped channel 74 of the lower track 66. When the door 20 is in the closed position the far side edge 32 of the door 20 is situated within the u-shaped channel 82 of the receiving track 76. When the door 20 is opened the upper and lower edges 28,30 of the door 20 slide along the upper and lower tracks 56,66, respectively, and the near side edge 34 of the door 20 passes through the vertical door aperture 84 and the door 20 is drawn into the housing component 4. The upper and lower tracks 56,66 may further comprises a lubricating material 88 set within the u-shaped channels 64,74 of the tracks 56,66, thereby facilitating the movement of the door 20 along said tracks 56,66. In one embodiment the three tracks 56,66,76 may be formed into the casing 2 as a single unit. In yet another embodiment the receiving track 76 may be curved, thereby causing the pet access aperture 16 to have a non-rectangular shape.

In another embodiment, a portion of the top panel 42 is situated above the pet access aperture 16 and extends to the exterior portion 36 of the casing 2, thereby forming an exterior roof 86 over the pet access aperture 16. In yet another embodiment, a portion of the top panel 42 is situated above the pet access aperture 16 and extends to the interior portion 38 of the casing 2, thereby forming an interior roof 87 over the pet access aperture 16. In either embodiment the roofs 86,87 are suitably adapted to direct the head of the pet 18 downward upon the pet 18 approaching the pet access aperture 16 from the direction of either the exterior portion 36 of the casing 2 or the interior portion 38 of the casing 2. In doing so it brings the subcomponents of the identification component 14 in close proximity to each other, thereby increasing the effectiveness of the identification sequence. The exterior roof 86 also helps keep rain and snow from coming through the pet access aperture 16 when the door 20 is in the open position. In yet another embodiment, the exterior roof 86 further comprises a roof extension 85 removably attached to the exterior roof 86, thereby increasing the weather protection offered by the exterior roof 86. For facilitating shipping and installation of the device 1, the roof extension 85 may be removed.

In another embodiment, the casing 2 further comprises an enclosure 93 removably attached to the exterior portion 36 of the casing 2, such that the enclosure 93 fully encloses the area immediately adjacent to the exterior portion 36 of the casing 2. This feature is useful, for example, in urban areas where a pet 18 is allowed only restricted egress through the device 1 for safety reasons. The enclosure 93 may be suitably dimensioned to accommodate a litter box, and may be suitably adapted to provide fresh air through apertures and viewing opportunities through windows or clear structural elements, such as walls constructed of a transparent material.

Figure 2:
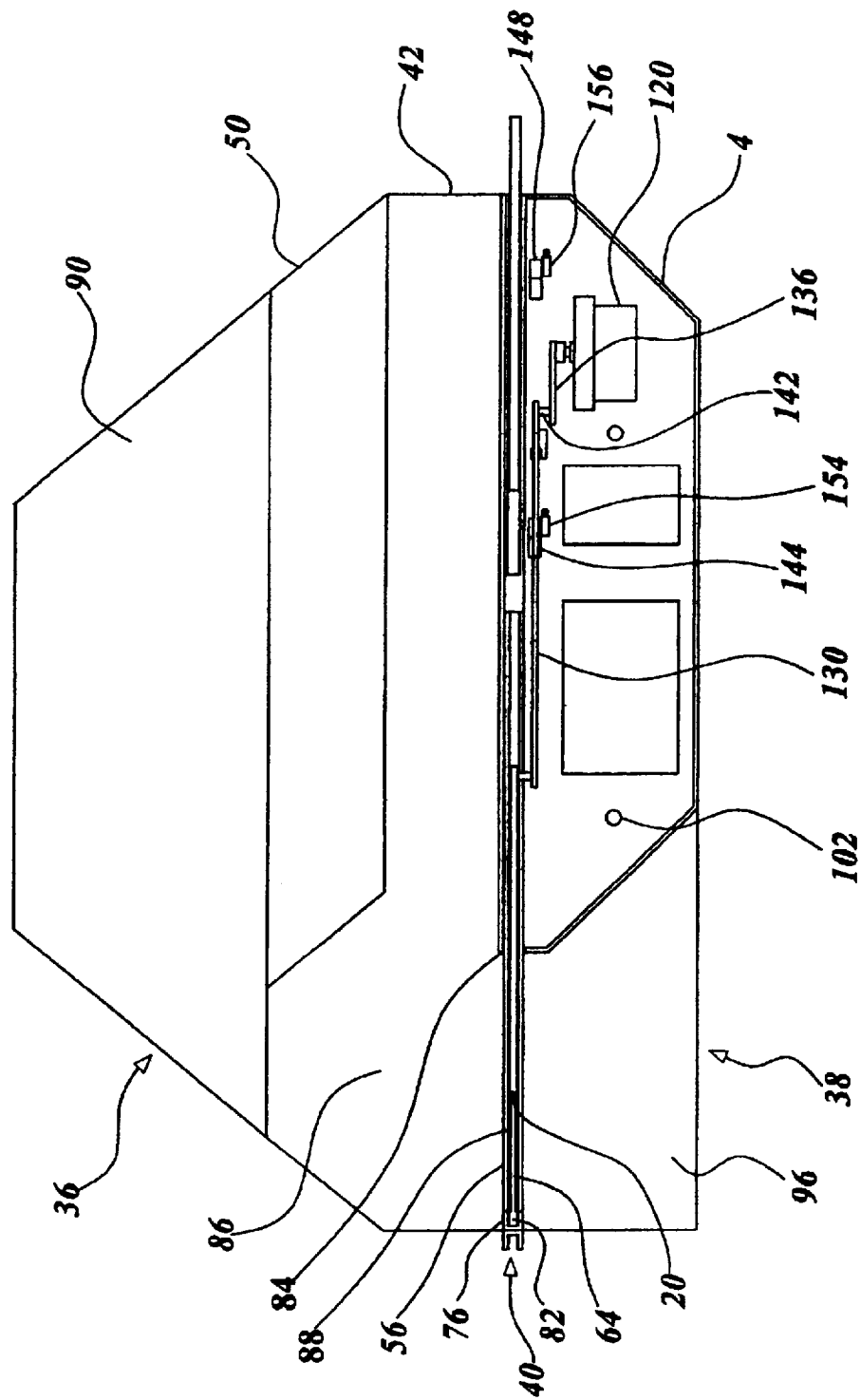
FIG. 2 is a top view of the device, with a portion of the top panel cut away at the midline plane. The door is shown in a partially opened position corresponding to the position of the door in FIG. 1.

FIG. 2 shows details of the pet access platform component 8. The pet access platform component 8 comprises an exterior platform 90 oriented substantially coplanar with the base panel 50 and situated adjacent to and in connection with the base panel 50 on the exterior portion 36 of the casing 2. The exterior platform 90 gives the pet 18 a platform on which to stand when the device 1 is located above ground or floor level. A pet 18 can jump onto the exterior platform 90, and then move towards the pet access aperture 16 to gain entry. In one embodiment the exterior platform 90 is covered by a non-slip material 92, providing safety to the pet 18. In another embodiment the exterior platform 90 is removably attached to the base panel 50, facilitating shipping and installation of the device 1. If the device 1 is installed at ground or floor level, or there already exists a platform of some sort exterior to the casing 2, the removable exterior platform 90 need not be utilized. In yet another embodiment, the exterior platform 90 further comprises an exterior ramp 94. The exterior ramp 94 is removably attached to the exterior platform 90 and extends to the ground or floor, or to some other stable platform, thereby assisting a pet 18 in gaining access to the device 1. The exterior ramp 94 may come in various sizes and configurations, thereby allowing use of the device 1 in upper story windows 22.

In another embodiment, the pet access platform component 8 further comprises an interior platform 96, oriented substantially coplanar with the base panel 50 and situated adjacent to and in connection with the base panel 50 on the interior portion 38 of the casing 2. The interior platform 96 gives the pet 18 a platform on which to stand when the device 1 is located above ground or floor level. A pet 18 can jump onto the interior platform 96, and then move towards the pet access aperture 16 to exit. In one embodiment the interior platform 96 is covered by a non-slip material 92, providing safety to the pet 18. In another embodiment the interior platform 96 is removably attached to the base panel 50, facilitating shipping and installation of the device 1. If the device 1 is installed at ground or floor level, or there already exists a platform of some sort, such as a piece of furniture, interior to the casing 2, the removable interior platform 96 need not be utilized. In yet another embodiment, the interior platform 96 further comprises an interior ramp 95. The interior ramp 95 is removably attached to the interior exterior platform 90 and extends to the floor, or to some other stable platform, thereby assisting a pet 18 in gaining access to the device 1.

Figure 3:
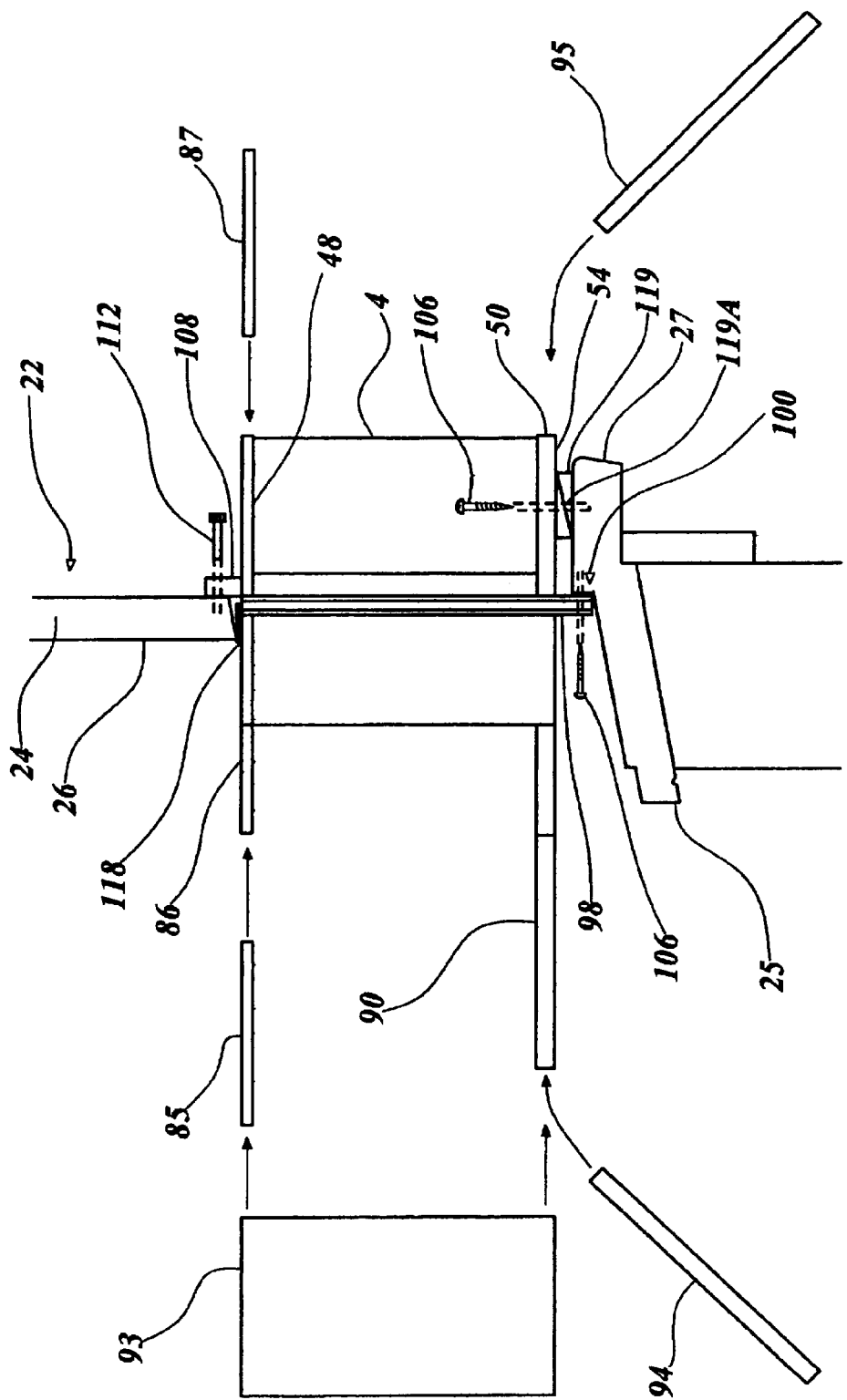
FIG. 3 is a side view of the device as mounted in a double hung window. The final position of the sash fasteners and the bottom fasteners are indicated by dotted lines. The optional elements of the exterior and interior roofs and exterior and interior ramps are shown with arrows indicating where they would attach to the device if used.

FIG. 3 shows details of the window mount component 10. The window mount component 10 comprises a bottom flange 98 integrated into the lower surface 54 of the base panel 50 and a top flange 108 integrated into the upper surface 46 of the top panel 42. The bottom flange 98 is adapted to fit against and exterior to an interior window stop 100 located on the lower portion of a window unit 22, such as a stool cap 27 or a sill 25. Distributed along the length of the bottom flange 98 are a plurality of bottom flange apertures 104 which pass through the bottom flange 98. A plurality of bottom fasteners 106 are adapted to pass through the bottom flange apertures 104 and into the window stop 100. Distributed about the base panel 50 are a plurality of base panel apertures 102 which pass through the base panel 50. A plurality of bottom fasteners 106 are adapted to pass through the base panel apertures 102 and into the window unit 22. The bottom fasteners 106 secure the device 1 to the window unit 22 with a minimum of structural modification to the window unit 22. In one embodiment the bottom fasteners 106 are wood screws.

The top flange 108 is adapted to fit against and interior to the lower edge of a window sash 26 of a double hung window 22. Distributed along the length of the top flange 108 are a plurality of top flange apertures 110 which pass through the top flange 108. A plurality of sash fasteners 112 are adapted to pass through the top flange apertures 110 and into the window sash 26, thereby securing the window 22 to the device 1. In one embodiment, the sash fasteners 112 are further adapted to be removably attached to a window sash 26. In this embodiment the sash fasteners 112 may be cylindrical pins. With the sash fasteners 112 in place, passing through the top flange apertures 110 and into the window sash 26, the window 22 is secured in the closed position; with the sash fasteners 112 removed, the window 22 may be raised. Additional support devices may be required to maintain the upper sash 26 of the double hung window 22 in the closed position when the device 1 is installed. Moreover, screens, storm windows, and the like, which are situated exterior to the double hung window 22, may be partially raised and then set down on the top panel 42, enabling them to function in conjunction with the device 1.

The window mount component 10 further comprises a first lateral adaptor panel 114. The first lateral adaptor panel 114 is substantially rectangular and has a height substantially equal to the height of the casing 2. It is affixed to the casing 2 on the side of the housing component 4 opposite the pet access aperture 16, and is of a suitable shape and size to cover an opening in the window 22 between the housing component 4 and the window frame 24. The first lateral adaptor panel 114 is adapted to permit installation of the device 1 in windows 22 of varying width. In one embodiment the first lateral adaptor panel 114 is adjustable, permitting it to be dynamically extended laterally to cover the space between the housing component 4 and the window frame 24. In another embodiment the first lateral adaptor panel 114 is delivered as a solid panel to be custom cut by the purchaser to fit the space between the housing component 4 and the window frame 24.

In yet another embodiment, the window mount component 10 further comprises a second lateral adaptor panel 116. The second lateral adaptor panel 116 is substantially rectangular and has a height substantially equal to the height of the casing 2. It is affixed to the casing 2 on the side of the casing 2 opposite the location of the first lateral adaptor panel 114 and adapted to cover an opening in the window 22 between the casing 2 and a window frame 24 on the side of the casing 2 opposite the first lateral adaptor panel 114. The use of the second lateral adaptor panel 116 in conjunction with the first lateral adaptor panel 114 gives added flexibility in the size of the window 22 in which the device 1 may be installed. In addition, the use of the two panels 114,116 on either side of the casing 2 results in there being smaller spaces on either side of the casing 2 between the casing 2 and the window frame 24, rather than one large space on only one side of the casing 2, thereby reducing the risk of a security breach if one or either of the lateral adaptor panels 114,116 is compromised. In yet another embodiment one or both of the lateral adaptor panels 114,116 may be constructed of a transparent material.

In yet another embodiment, the window mount component 10 further comprises weather stripping 118 suitably adapted to reduce the incidence of weather passing between the window mount component 10 and the window unit 22. The weather stripping 118 may consist of rubberized strips, or felt, or any such other suitable material, and should be situated wherever the device 1 is intended to come in contact with the window unit 22. In one embodiment, the weather stripping 118 is comprised of a rubberized sheet situated along the lower surface 54 of the base panel 50, a rubberized strip affixed to the upper surface 46 of the top panel 42 along side, adjacent, and exterior to the top flange 108, and rubberized strips along the edges of the lateral adaptor panels in contact with the window frame 24. The weather stripping 118 may also consist of a foam insert to be inserted between the upper and lower sashes 26 of a double hung window 22, thereby reducing the incidence of weather passing between the two window sashes 26 when the device 1 is installed. The presence of the weather stripping 118 serves the additional purpose of acting as a barrier to insects.

In yet another embodiment, the window mount component 10 further comprises one or more shims 119 suitably adapted to fit between the base panel 50 and the window unit 22. The use of the shims 119 enables the device 1 to be installed securely in a wide range of window designs. In one embodiment the shims 119 are horseshoe shaped. In another embodiment the shims 119 contain apertures 119A adapted to be aligned with the base panel apertures 102 and to accommodate the bottom fasteners 106, thereby securing the shims 119 in place.

Figure 4:
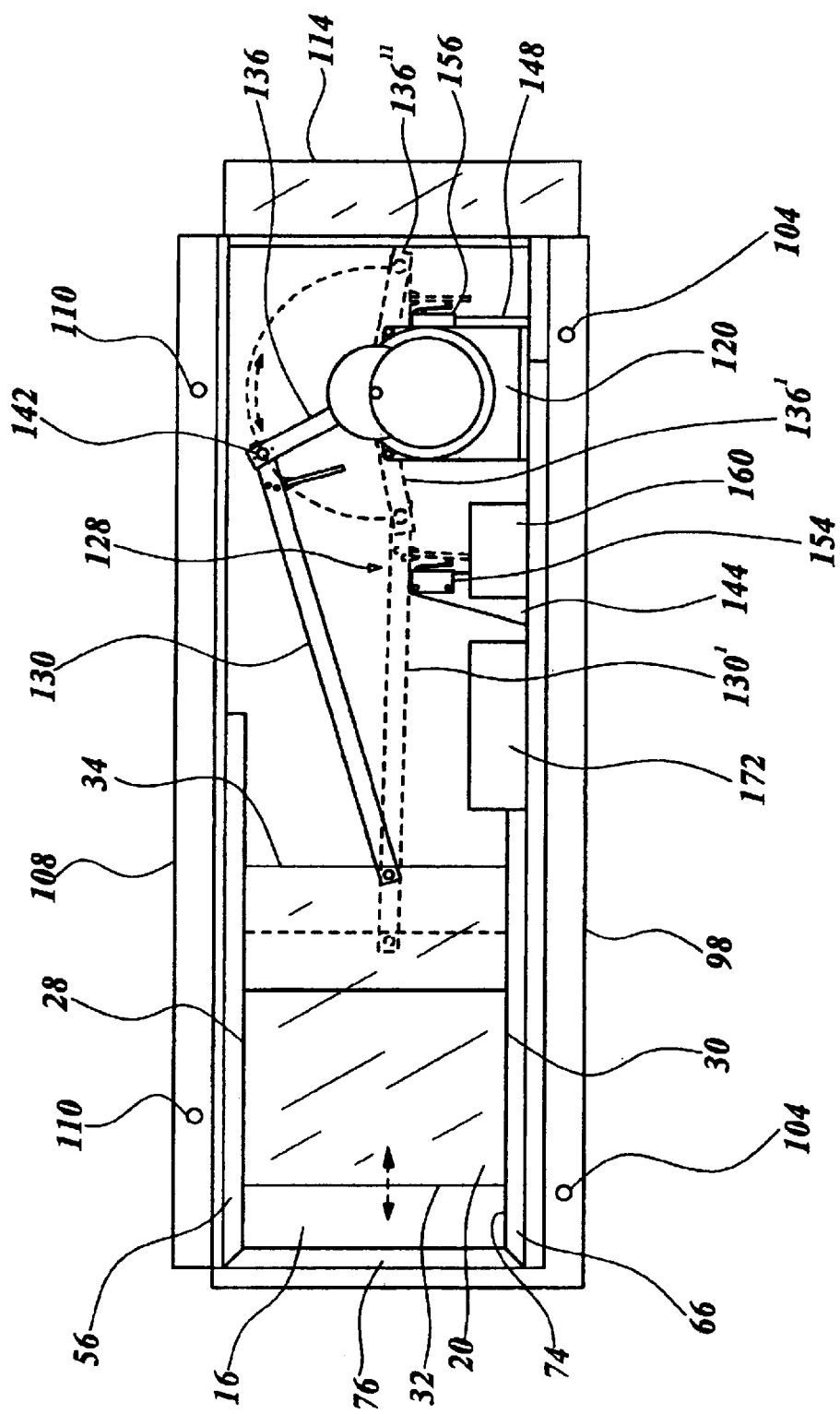
FIG. 4 is a rear view of the device with the rear portion of the housing component removed, thereby revealing the door positioning component. The door is shown in a partially opened position corresponding to the position of the door in FIG. 1. The door is also shown in the fully closed position, indicated by the near side edge of the door drawn with dotted lines, and with the first and second pull arms drawn with dotted lines and labeled with a single prime. The position of the second pull arm is also shown when the door is in the fully opened position, indicated by dotted lines and labeled with a double prime.
Figure 4A:
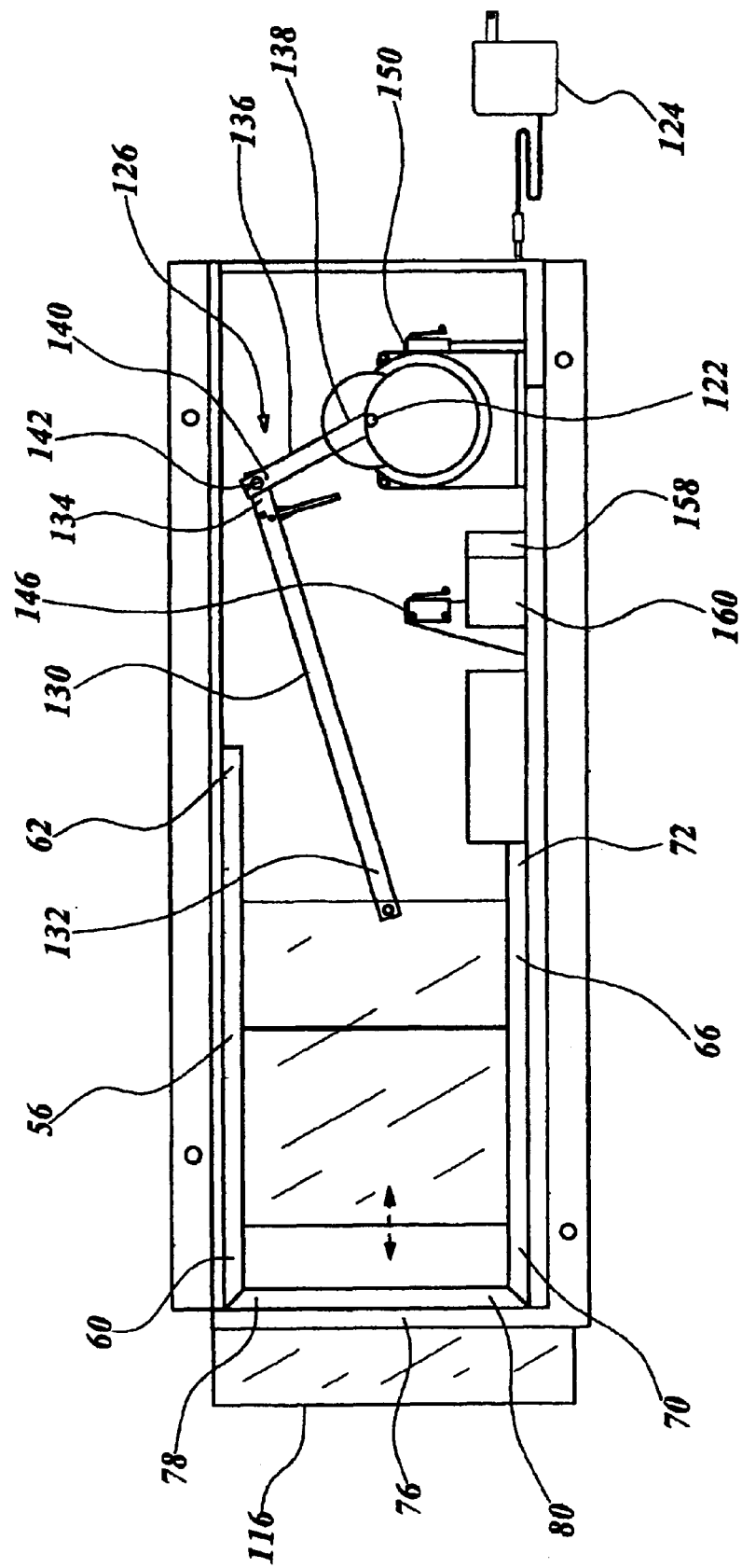
FIG. 4A is an alternate rear view of the device with the rear portion of the housing component removed. The door is shown in a partially opened position corresponding to the position of the door in FIG. 1. The second lateral adaptor panel is shown, as well as the power supply.
Figure 5:
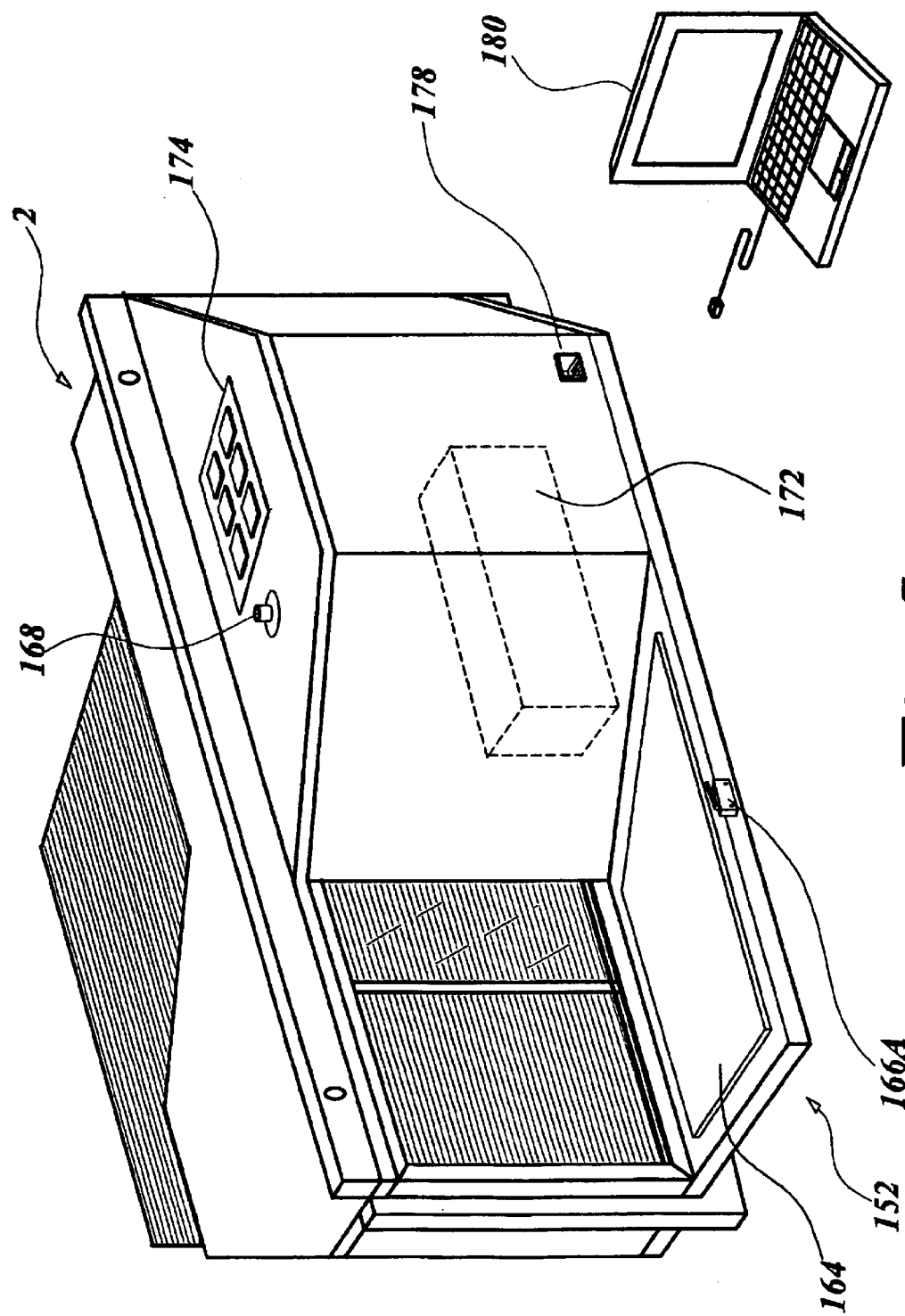
FIG. 5 is a perspective view of the device showing the location of the radio frequency identification component within the housing (in a dotted line depiction) as well as several optional elements.
Figure 6:
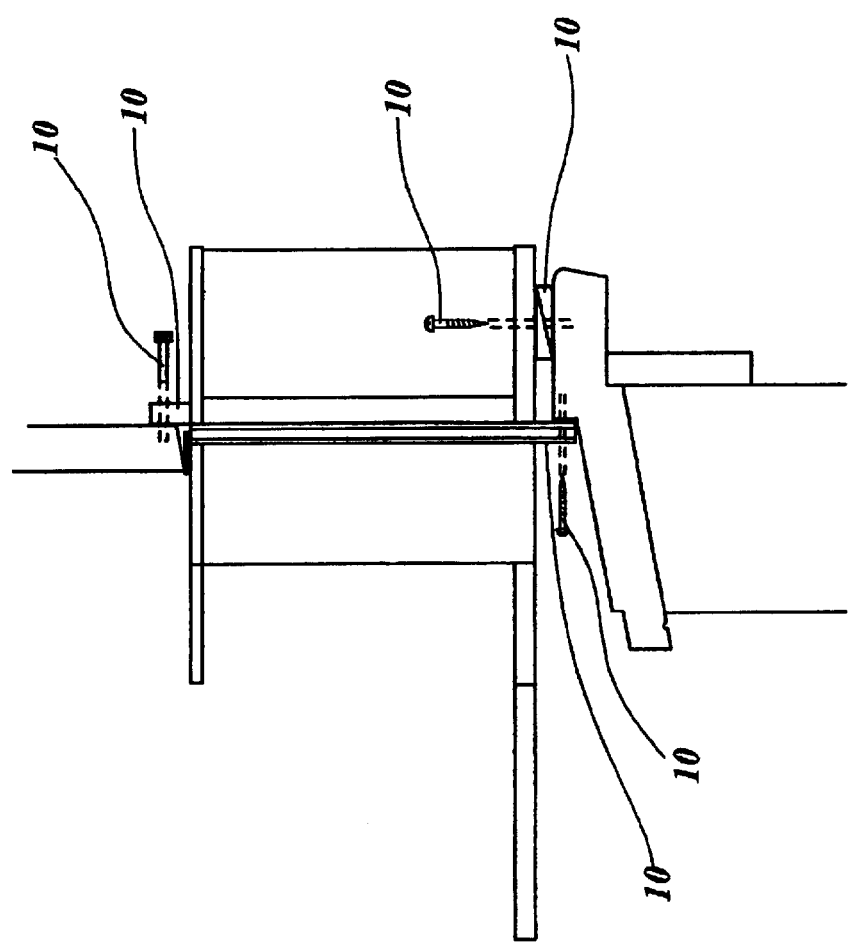
FIG. 6 is a side view of the device as mounted in a double hung window, with subcomponents of the window mount component labeled with a single label.
Figure 7:
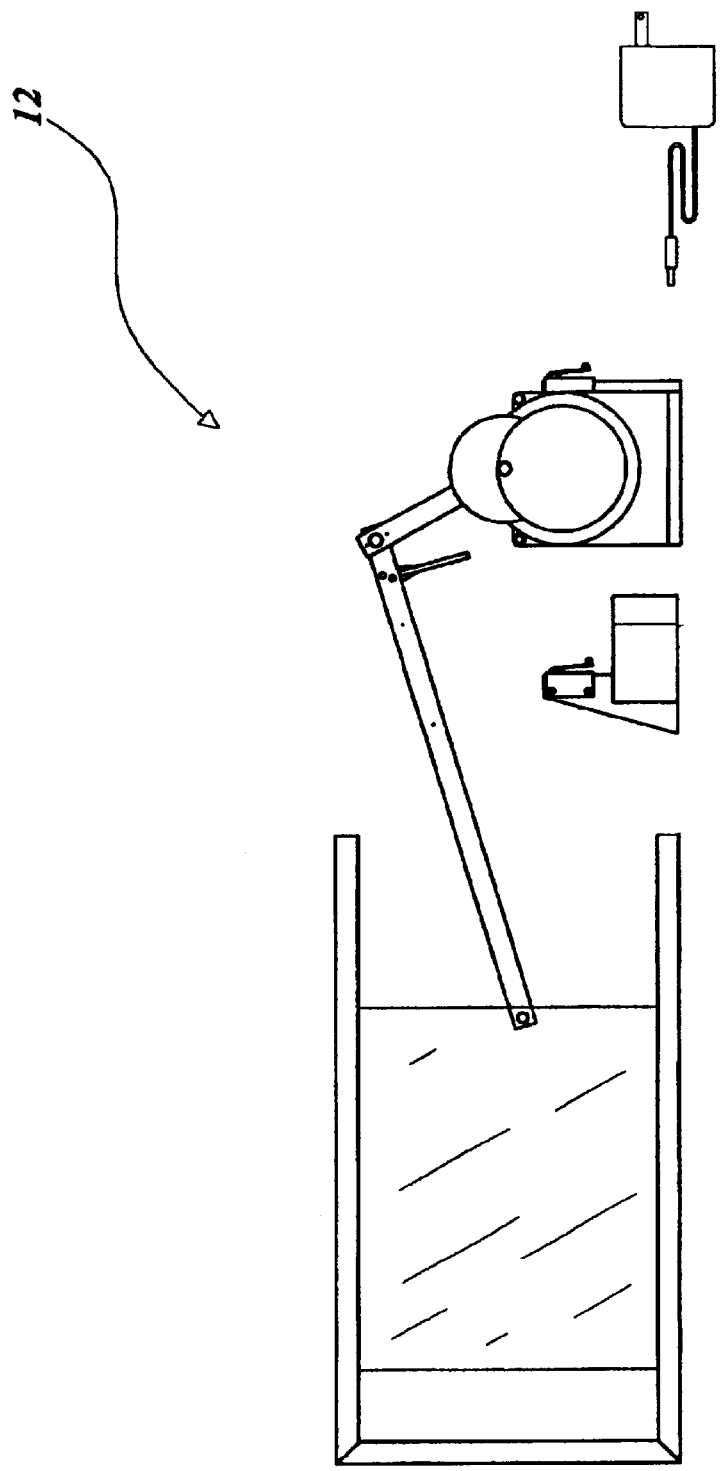
FIG. 7 is a rear view of the device showing only those elements comprising subcomponents of the door positioning component.
Figure 8:
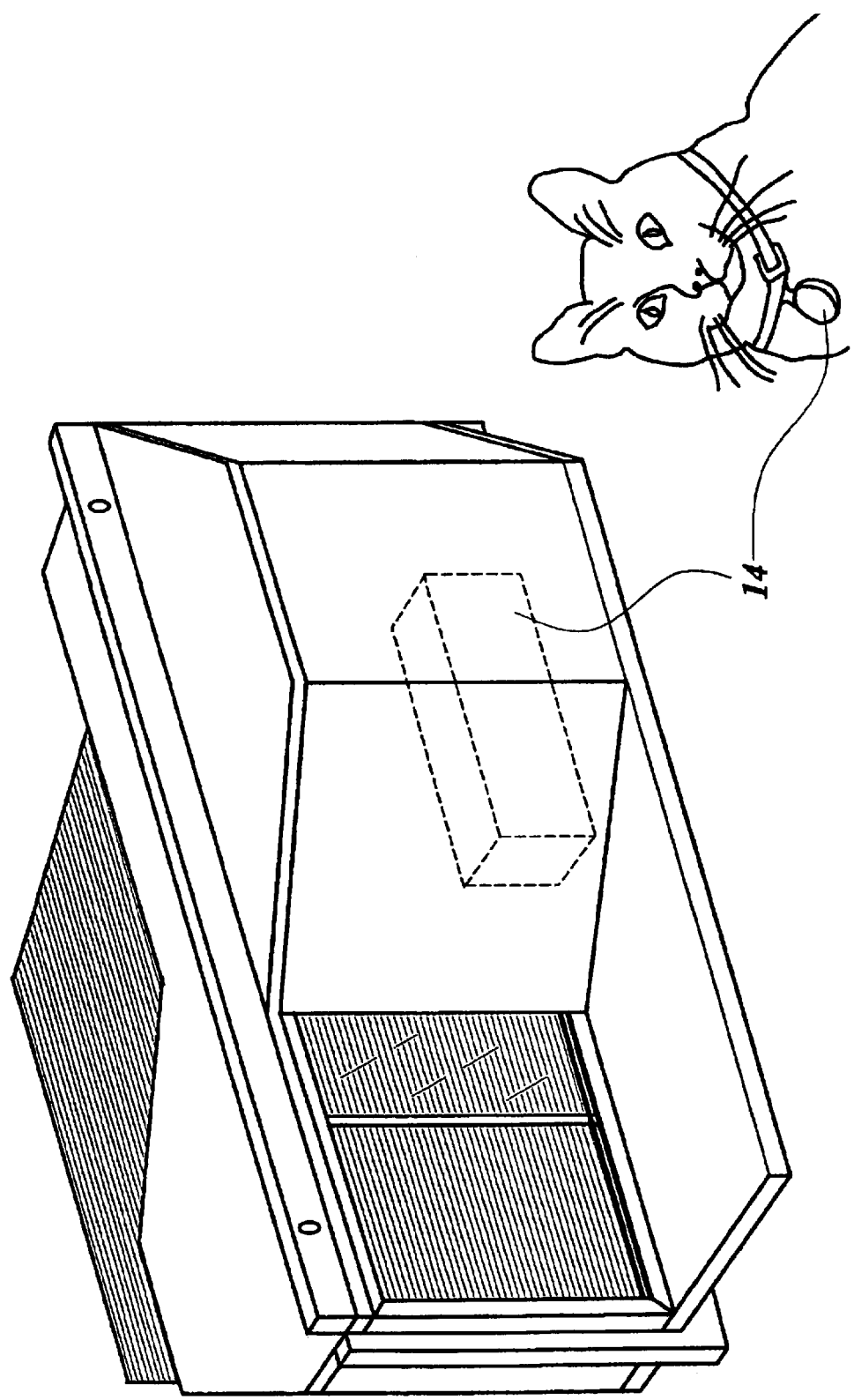
FIG. 8 is a perspective view of the device showing a dotted line depiction of the radio frequency identification component and a pet carrying a key device, whereby the radio frequency identification component and the key device are labeled with a single label indicating they are subcomponents of the pet identification component.

FIG. 4 shows details of the door positioning component 12. The door positioning component 12 comprises an electric motor 120, a power supply 124, a mechanical positioning component 126, and a control component 128. The power supply 124 provides power to the electric motor 120, enabling it to operate. The control component 128 determines when and in which direction the electric motor 120 operates. The electric motor 120, when operating, moves the mechanical positioning component 126, which in turn positions the door 20 to uncover or cover the pet access aperture 16.

In one embodiment, the electric motor 120 is situated within the housing component 4 and fixedly attached to the upper surface 52 of the base panel 50. The electric motor 120 has a shaft 122 and is electronically controlled to operate in one of two opposing directions, such that the shaft 122 may be rotated in either a clockwise or a counterclockwise direction. The mechanical positioning component 126 is also situated within the housing component 4 and is attached to the shaft 122 and to the door 20. The power supply 124 is in connection with the electric motor 120 and adapted to provide power to the electric motor 120. In one embodiment the power supply 124 comprises a 110 volt A/C to 12 volt D/C converter with a standard plug at one end, enabling it to be plugged into a standard wall outlet and enabling the device 1 to run on 12 volt D/C.

FIG. 4 also shows details of the operation of the mechanical positioning component 126. The mechanical positioning component 126 comprises a first pull arm 130, a second pull arm 136, a pull arm pivot 142, a first stop block 144, and a second stop block 148. The first and second pull arms 130,136 are constructed of a rigid material, such as steel, are substantially long and thin in shape, and each has a first end 132,138 and a second end 134,140. The first and second pull arms 130,136 are pivotally in connection with each other by the pull arm pivot 142 at their respective second ends 134,140. The pull arm pivot 142 may be of any suitable configuration, such as a bolt and washer combination, or a cotter pin, or the like. The first pull arm 130 is pivotally connected at its first end 132 to the door 20 at the near side edge 34 of the door 20, and the second pull arm 136 is fixedly connected at its first end 138 to the shaft 122 of the electric motor 120. In this configuration, operation of the electric motor 120 causes the shaft 122 to rotate, thereby rotating the second pull arm 136 about its first end 138 and causing the second end 140 of the second pull arm 136 to travel in an arc, which in turn causes the first pull arm 130 to move and thus results in the door 20 being properly positioned. When the electric motor 120 is activated to open the door 20, the electric motor 120 causes the second pull arm 136 to rotate about the first end 138 of the second pull arm 136 in an upward and backward direction away from the pet access aperture 16, pivoting the first pull arm 130 about the first end 132 of the first pull arm 130 in an upward and then downward direction while simultaneously drawing the first pull arm 130 in the direction of the electric motor 120, thereby drawing the door 20 into the housing component 4 and uncovering the pet access aperture 16. When the electric motor 120 is activated to close the door 20, the electric motor 120 causes the second pull arm 136 to rotate about the first end 138 of the second pull arm 136 in an upward and forward direction towards the pet access aperture 16, pivoting the first pull arm 130 about the first end 132 of the first pull arm 130 in an upward and then downward direction while simultaneously pushing the first pull arm 130 in a direction away from the electric motor 120, thereby pushing the door 20 out of the housing component 4 and causing the door 20 to cover the pet access aperture 16.

The first and second stop blocks 144,148 are utilized to control the operation of the electric motor 120, and the first stop block 144 additionally serves as a security device to prevent the door 20 from being forcibly opened without activation of the electric motor 120. The first stop block 144 is constructed of a rigid material and has a top side 146. It is fixedly attached to the upper surface 52 of the base panel 50 and situated directly below the first pull arm 130 when the door 20 is in the closed position. When the door 20 is in a closed position the first end 132 of the first pull arm 130 and the first end 138 of the second pull arm 136 are at substantially the same height above the upper surface 52 of the base panel 50, and the pull arm pivot 142 is at a slightly lower height than the first ends 132,138 of the pull arms, resulting in the first pull arm 130 and the second pull arm 136 forming a shallow v-shape with respect to each other. When so positioned the first pull arm 130 rest on the top side 146 of the first stop block 144. The second stop block 148, also constructed of a rigid material and having a top side 150, is fixedly attached to the upper surface 52 of the base panel 50 and situated on the opposite side of the electric motor 120 from the door 20 and directly below the first pull arm 130 when the door 20 is in the fully opened position. When the door 20 is in a fully opened position the second pull arm 136 has been rotated slightly more than 180 degrees from its shallow v-shape orientation, resulting in the second pull arm 136 being oriented substantially horizontally, and the first pull arm 130 being aligned substantially in parallel with the second pull arm 136. In this position, the first pull arm 130 comes into contact with the top side 150 of the second stop block 148, thereby preventing further rotation of the second pull arm 136 and any further movement of the door 20. Attached to both stop blocks 144,148 are limit switches 154,156. When the pull arms contact the stop blocks the limit switches 154,156 are engaged, which then cause the operation of the electric motor 120 to stop.

Because of the shallow v-shape of the pull arms 130,136 relative to each other when the door 20 is in the closed position, any lateral force applied to the door 20 in an attempt to open it without use of the electric motor 120 would tend to cause the pull arms 130,136 to pivot downward; however, the first stop block 144 prevents the pull arms 130,136 from moving in such a direction, thereby effectively locking the door 20 in the closed position. The control component 128 of the device 1 comprises an activation component 152, a first limit switch 154 fixedly attached to the first stop block 144, a second limit switch 156 fixedly attached to the second stop block 148, a timer 158, and a motor controller 160. The activation component 152 is in connection with the motor controller 160; upon the occurrence of an appropriate activation event, the activation component 152 causes the motor controller 160, which is in connection with the electric motor 120, to activate the operation of the electric motor 120 in a first direction such that the mechanical positioning component 126 draws the door 20 into the housing component 4, thereby uncovering the pet access aperture 16. The second limit switch 156 is in connection with the motor controller 160 and with the timer 158; when the first pull arm 130 contacts the second stop block 148 and causes the second limit switch 156 to become engaged, indicating that the door 20 has reached the fully opened position, the second limit switch 156 causes the motor controller 160 to deactivate the operation of the electric motor 120 and causes the activation of the timer 158. The timer 158, which is in connection with the motor controller 160, upon the expiration of a predetermined period of time after its activation, causes the motor controller 160 to activate the operation of the electric motor 120 in a second direction opposite the first direction such that the mechanical positioning component 126 pushes the door 20 out of the housing component 4, thereby covering the pet access aperture 16. The first limit switch 154 is in connection with the motor controller 160; when the first pull arm 130 contacts the first stop block 144 and causes the first limit switch 154 to become engaged, indicating that the door 20 has reached the fully closed position, the first limit switch 154 causes the motor controller 160 to deactivate the operation of the electric motor 120. In one embodiment, the time-out period for the timer 158 is five seconds. In another embodiment, the time-out period may be adjusted as desired. As a safety feature, the electric motor 120 is suitably adapted to provide the minimal force necessary to position the door 20. Thus, if a pet 18 remains within the pet access aperture 16 when the door 20 is in the process of closing, the contact of the door 20 with the pet 18 will not harm the pet 18. In another embodiment, a safety microswitch is in connection with the motor controller 160 and mounted on the first end 132 of the first pull arm 130, and the first pull arm 130 is attached to the door 20 within a channel. Upon contact of the door 20 with a pet 18, continued force by the electric motor 120 causes the first pull arm 130 to slide within the channel and engage the safety microswitch, which then activates the motor controller 160 to reverse the electric motor 120. Other embodiments of the control component 128 may be evident to those skilled in the art. This specification contemplates and incorporates all such embodiments for use with the device 1.

The activation component 152 of the control component 128 comprises the identification component 14, in connection with the motor controller 160. The occurrence of an appropriate activation event is identified by the identification component 14 which then signals the motor controller 160 to begin the sequence of opening and closing the door 20. In one embodiment, the identification component 14 comprises a key device 170, also known as a transponder, adapted to be carried by a pet 18 and suitably adapted to transmit a radio signal in an identifiable manner, and a radio frequency identification component 172, also known as an interrogator or reader, situated within the housing component 4 and suitably adapted to transmit and receive radio signals a short distance exterior to the housing component 4 and in near proximity to the door 20. The key device 170 is energized by the radio signals transmitted by the radio frequency identification component 172; it therefore does not need its own independent power supply. The combination of a key device 170 and a radio frequency identification component 172 is well known in the industry. In one embodiment, the radio frequency identification component 172 is adapted to generate a weak radio signal with an effective range of a few inches of the door 20. An antenna monitors for the presence of radio signals generated by the key device 170. When the key device 170 is brought within the field of the radio signals, it is energized by the radio signals transmitted by the radio frequency identification component 172 and in turn transmits its own signal, which is received by the radio frequency identification component 172. The radio frequency identification component 172 compares the radio signal from the key device 170 against a predetermined selection; a match indicates that the key device 170 corresponds to an authorized pet 18 and the door opening sequence is initiated. Multiple key devices 170 may be used with the device 1. A new key device 170 is initialized by placing it within the field of radio signals transmitted by the radio frequency identification component 172 and causing the radio frequency identification component 172 to register the key device 170 for future identification. In one embodiment the key device 170 is a collar tag to be worn by the pet 18. In another embodiment the key device 170 may be a subcutaneous implant. Thus, other pets 18 wearing similar key devices 170 can be screened, and access to the device 1 can be accurately controlled to the individual pet 18. This is an improvement over other devices disclosed in the prior art using non-specific identification keys, such as magnets, which would permit access to any pet 18 wearing a magnet key. In high density populations the number of pets 18 carrying identification keys is likely to be significant, thereby the use of an identification component 14 as disclosed herein increases the effectiveness of access control over the prior art devices which use non-specific keys for controlling access. Other embodiments of the radio frequency identification component 172 may be utilized in the device 1, provided the function of individual pet identification is met.

In another embodiment, the activation component 152 further comprises a pressure plate 164 and a microswitch 166A. The pressure plate 164 is spring-mounted onto the interior platform 96 proximate to the door 20, such that the application of a downward force on the pressure plate 164 causes the pressure plate 164 to move downward towards the interior platform 96 and the removal of the downward force allows the pressure plate 164 to move upward away from the interior platform 96. The microswitch 166A is situated on the interior platform 96 below the pressure plate 164, is in connection with the motor controller 160, and is suitably adapted to send a signal to the motor controller 160 when activated. The application of a sufficient downward force to the pressure plate 164 causes the pressure plate 164 to move downwards until it contacts the microswitch 166A, which then begins the sequence of opening and closing the door 20. Such a downward force is calibrated to approximate the weight of a small pet 18 standing on the pressure plate 164.

In yet another embodiment, the activation component 152 further comprises a bypass switch 168. The bypass switch 168 is in connection with the motor controller 160 and is suitably adapted to send a signal to the motor controller 160 when the bypass switch 168 is manually activated. In one embodiment the bypass switch 168 is mounted on the housing component 4.

In yet another embodiment, the activation component 152 further comprises a magnetic key, adapted to be carried by a pet 18, and a relay suitably adapted to be activated by a magnetic field, situated within the housing component 4 and suitably adapted to activate the motor controller 160.

In one embodiment of the device 1, the control component 128 further comprises a data entry pad 174 and an interface component 178. The first interface component 178 is in connection with the data entry pad 174 and is suitably adapted to communicate data between the data entry pad 174 and the control component 128 to perform control functionality. In this embodiment, the data entry pad 174 may be used to set the time-out period of the timer 158, to select which of multiple key devices 170 will be permitted access, to establish timing and directional restrictions on an individual pet's 18 access to the device 1, and to control other aspects of the device 1. The data entry pad 174 may be configured any number of ways, including having a numeric keypad, or up/down scroll buttons, or other suitable means for accomplishing the desired functionality.

In another embodiment of the device 1, the control component 128 comprises the interface component 178 suitably adapted to communicate with a computer 180 for data gathering, processing, and control functionality. Thus, a user can not only modify control aspects of the device 1, but can also gather and analyze data concerning the use patterns of the device 1 by authorized pets 18. Utilizing the functionality of the internet, the interface component 178 may allow control and monitoring of the device 1 from remote locations, such as when a pet owner is on vacation. The interface component 178 is adapted for use with a personal computer 180 utilizing software appropriate for the functionality desired.

As described, the device 1 is an improved design for an automatic pet access door over the prior art. It allows installation in a window 22, thereby avoiding the major structural modification requirements of prior art designs, as well as allowing easy portability, from room to room as needed or even from house to vacation home, for example, if the pet 18 resides in different seasonal locations. The device 1 incorporates a pet-specific identification component 14 to better restrict access to only authorized pets 18. The pet access platform component 8 and the available ramp system allows installation of the device 1 in otherwise inconvenient locations, increasing its utility to the pet owner.

Modifications and variations can be made to the disclosed embodiments of the device 1 without departing from the subject or spirit of the device 1 as defined in the following claims.

What is claimed is:

1. A pet door device, comprising
a casing, having a housing component;
a pet access platform component;
a window mount component;
a door positioning component; and
an identification component;
wherein the casing contains a pet access aperture through which a pet may pass and a laterally sliding door suitably adapted for covering and uncovering the pet access aperture, the pet access platform component is situated adjacent to the pet access aperture providing the pet with a platform next to the door on which to stand, the window mount component secures the device to a double hung window and permits operation of both the device and the window, the door positioning component is situated within the housing component, is electrically powered, is activated by the pet, and moves the door laterally to cover and uncover the pet access aperture, and the identification component diserns between individual animals and permits access through the pet access aperture only to designated pets under predetermined conditions.

2. The device of claim 1, wherein the door is planar, is constructed of a rigid material, is of a uniform thickness, is substantially rectangular in shape having an upper edge, a lower edge, a far side edge, and a near side edge, and is suitably dimensioned to substantially cover the pet access aperture when the door is in a closed position.

3. The device of claim 2, wherein the door is constructed of a transparent, colorless material.

4. The device of claim 2, wherein the casing further comprises
an exterior portion;
an interior portion; and
a midline plane being oriented substantially vertically and separating the exterior portion from the interior portion;
whereby the pet access aperture is situated within the casing substantially coplanar with the midline plane.

5. The device of claim 4, wherein the casing further comprises
a top panel having an upper surface and a lower surface;
a base panel having an upper surface and a lower surface;
an upper track having a first end, a second end, and a u-shaped channel, said u-shaped channel being suitably dimensioned to accommodate the upper edge of the door;
a lower track having a first end, a second end, and a u-shaped channel, said u-shaped channel of said lower track being suitably dimensioned to accommodate the lower edge of the door; and
a receiving track having an upper end, a lower end, and a u-shaped channel, said u-shaped channel of said receiving track being suitably dimensioned to accommodate the far side edge of the door;
wherein the top panel is planar, is constructed of a rigid material, and is oriented in a substantially horizontal plane,
the base panel is planar, is constructed of a rigid material, and is oriented in a substantially horizontal plane parallel to the top panel, with the base panel being situated below the top panel,
the housing component is fixedly attached to the lower surface of the top panel and fixedly attached to the upper surface of the base panel and contains a vertical door aperture suitably adapted to accommodate the thickness of the door,
the upper track is situated along the lower surface of the top panel with the upper track extending through the vertical door aperture and into the housing component, with the u-shaped channel of the upper track oriented substantially downward,
the lower track is situated along the upper surface of the base panel with the lower track extending through the vertical door aperture and into the housing component, with the u-shaped channel of the lower track oriented substantially upward and with the lower track oriented substantially parallel to and in alignment with the upper track, and the receiving track is situated in connection with the upper track and the lower track such that the upper end of the receiving track is in connection with the first end of the upper track and the lower end of the receiving track is in connection with the first end of the lower track, with the receiving track being oriented substantially perpendicular to both the upper track and the lower track and having a substantially vertical orientation, and with the u-shaped channel of the receiving track oriented substantially towards the vertical door aperture, whereby the pet access aperture is defined by the upper track, the lower track, the receiving track, and the housing component.

6. The device of claim 5, wherein a portion of the top panel situated above the pet access aperture extends to the exterior portion of the casing to form an exterior roof over the pet access aperture.

7. The device of claim 6, wherein the exterior roof further comprises a roof extension removably attached to the exterior roof.

8. The device of claim 5, wherein the casing further comprises an enclosure removably attached to the exterior portion of the casing wherein the enclosure fully encloses an area immediately adjacent to the exterior portion of the casing thereby restricting the pet to said area.

9. The device of claim 5, wherein a portion of the top panel situated above the pet access aperture extends to the interior portion of the casing to form an interior roof over the pet access aperture.

10. The device of claim 5, wherein the upper track further comprises a lubricating material set within the u-shaped channel of the upper track, and the lower track further comprises a lubricating material set within the u-shaped channel of the lower track.

11. The device of claim 5, wherein the pet access platform component comprises an exterior platform oriented coplanar with the base panel and situated adjacent to and in connection with the base panel on the exterior portion of the casing.

12. The device of claim 11, wherein the exterior platform is covered by a non-slip material.

13. The device of claim 11, wherein the exterior platform is removably attached to the base panel.

14. The device of claim 11, wherein the exterior platform further comprises an exterior ramp removably attached to the exterior platform.

15. The device of claim 11, wherein the pet access platform component further comprises an interior platform oriented coplanar with the base panel and situated adjacent to and in connection with the base panel on the interior portion of the casing.

16. The device of claim 15, wherein the interior platform is covered by a non-slip material.

17. The device of claim 15, wherein the interior platform is removably attached to the base panel.

18. The device of claim 15, wherein the interior platform further comprises an interior ramp removably attached to the interior platform.

19. The device of claim 5, wherein the window mount component comprises a bottom flange integrated into the lower surface of the base panel and adapted to fit against a window stop of the window;

a plurality of base panel apertures passing through the base panel;

a plurality of bottom flange apertures passing through the bottom flange;

a plurality of bottom fasteners adapted to pass through the base panel apertures and through the bottom flange apertures and into the window;

a top flange integrated into the upper surface of the top panel and adapted to fit against a window sash of the window;

a plurality of top flange apertures passing through the top flange;

a plurality of sash fasteners adapted to pass through the top flange apertures and into the window sash; and a first lateral adaptor panel, being substantially rectangular and having a height substantially equal to a height of the casing, being in connection with the casing and adapted to cover an opening in the window between the casing and a window frame.

20. The device of claim 19, wherein the sash fasteners are further adapted to be removably attached to the window sash.

21. The device of claim 19, wherein the first lateral adaptor panel is adjustable.

22. The device of claim 19, wherein the window mount component further comprises a second lateral adaptor panel being substantially rectangular and having a height substantially equal to the height of the casing, being in connection with the casing and adapted to cover an opening in the window between the casing and the window frame on the side of the casing opposite the first lateral adaptor panel.

23. The device of claim 19, wherein the window mount component further comprises weather stripping.

24. The device of claim 19, wherein the window mount component further comprises at least one shim suitably adapted to fit between the base panel and the window.

25. The device of claim 5, wherein the door positioning component comprises an electric motor having a shaft and being fixedly attached to the upper surface of the base panel within the housing component;

a power supply, in connection with the electric motor and adapted to provide power to the electric motor;

a mechanical positioning component, situated within the housing component; and a control component;

whereby the electric motor, as controlled by the control component, causes the mechanical positioning component to move the door between the closed position in which the pet access aperture is covered and an opened position in which the pet access aperture is uncovered.

26. The device of claim 25, wherein the mechanical positioning component comprises a first pull arm, constructed of a rigid material and having a first end and a second end;

a second pull arm, constructed of a rigid material and having a first end and a second end;

a pull arm pivot;

a first stop block, constructed of a rigid material and having a top side, and being fixedly attached to the upper surface of the base panel and situated below the first pull arm when the door is in the closed position; and a second stop block, constructed of a rigid material and having a top side, and being fixedly attached to the upper surface of the base panel and situated below the first pull arm when the door is in the opened position and on an opposite side of the electric motor from the door;

wherein the first end of the first pull arm is pivotally connected to the door at the near side edge of the door, the first end of the second pull arm is fixedly connected to the shaft of the electric motor, and the second end of the first pull arm is pivotally connected to the second end of the second pull arm by the pull arm pivot.

27. The device of claim 26, wherein the control component comprises an activation component;

a first limit switch, fixedly attached to the first stop block;

a second limit switch, fixedly attached to the second stop block;

a timer; and a motor controller;

wherein the motor controller is in connection with the electric motor, the activation component is in connection with the motor controller and causes the motor controller to activate the operation of the electric motor in a first direction, the second limit switch is in connection with the motor controller and with the timer and when activated causes the motor controller to deactivate the operation of the electric motor and causes the activation of the timer, the timer is in connection with the motor controller and upon the expiration of a predetermined period of time after its activation causes the motor controller to activate the operation of the electric motor in a second direction opposite the first direction, and the first limit switch is in connection with the motor controller and when activated causes the motor controller to deactivate the operation of the electric motor.

28. The device of claim 27, wherein the activation component comprises the identification component, in connection with the motor controller;

wherein the identification component is suitably adapted to signal the motor controller when a predetermined identification event occurs.

29. The device of claim 28, wherein the identification component comprises a key device, adapted to be carried by the pet and suitably adapted to transmit a identifiable radio signal; and a radio frequency identification component, situated within the housing component, suitably adapted to transmit and receive radio signals in proximity to the door and to identify the radio signal transmitted by the key device.

30. The device of claim 28, wherein the activation component further comprises a pressure plate, spring-mounted onto the platform such that the application of a downward force on the pressure plate causes the pressure plate to move downward towards the platform and the removal of the downward force allows the pressure plate to move upward away from the platform;

a microswitch, situated on the platform below the pressure plate and in connection with the motor controller; and a bypass switch, in connection with the motor controller;

wherein the microswitch is suitably adapted to signal the motor controller when the downward force applied to the pressure plate is sufficient to cause the pressure plate to make contact with the microswitch, and the bypass switch is suitably adapted to signal the motor controller when the bypass switch is manually activated.

31. The device of claim 28, wherein the control component further comprises a data entry pad, situated on the casing; and a interface component, in connection with the data entry pad and suitably adapted to communicate data between the data entry pad and the control component.

32. The device of claim 28, wherein the control component further comprises interface component suitably adapted to communicate with a computer.

* * * * *